United States Patent
Tarozzi et al.

(10) Patent No.: US 9,194,732 B2
(45) Date of Patent: Nov. 24, 2015

(54) METERED DISPENSING CLOSURE WITH INDEXING FORMATIONS

(75) Inventors: Richard Tarozzi, Gales Ferry, CT (US);
Clifford Skillin, Blackstone, MA (US);
Patrick Brannon, Warwick, RI (US)

(73) Assignee: WestRock Slatersville, LLC, Norcross, GA (US)

( * ) Notice: Subject to any disclaimer, the term of this patent is extended or adjusted under 35 U.S.C. 154(b) by 0 days.

(21) Appl. No.: 13/982,931

(22) PCT Filed: Feb. 3, 2012

(86) PCT No.: PCT/US2012/023698
§ 371 (c)(1),
(2), (4) Date: Aug. 6, 2014

(87) PCT Pub. No.: WO2012/106561
PCT Pub. Date: Aug. 9, 2012

(65) Prior Publication Data
US 2014/0339268 A1      Nov. 20, 2014

Related U.S. Application Data

(60) Provisional application No. 61/439,040, filed on Feb. 3, 2011.

(51) Int. Cl.
*B67D 7/22* (2010.01)
*G01F 11/26* (2006.01)
*A47G 19/34* (2006.01)
(Continued)

(52) U.S. Cl.
CPC .............. *G01F 11/261* (2013.01); *A47G 19/34* (2013.01); *A47J 47/01* (2013.01); *G01F 11/003* (2013.01)

(58) Field of Classification Search
CPC ............ G01F 11/10; B65D 5/72; B67D 3/00
USPC ................. 222/370, 480, 565, 567, 569–570, 222/47–49, 153.04, 556–557
See application file for complete search history.

(56) References Cited

U.S. PATENT DOCUMENTS 2,710,118 A    6/1955   Stoddard
2,898,010 A    8/1959   Tepper
(Continued)

FOREIGN PATENT DOCUMENTS

WO            88/08683 A1     11/1988
WO         2011022118 A1      2/2011

*Primary Examiner* — Paul R Durand
*Assistant Examiner* — Andrew P Bainbridge
(74) *Attorney, Agent, or Firm* — Barlow, Josephs & Holmes, Ltd.

(57) ABSTRACT

A closure for dispensing a metered amount of dry product from a container includes a dispensing cap and a metering drum rotatably mounted on the dispensing cap. The dispensing cap has an upper deck with a dispensing aperture and a skirt engaging the neck of the container. The metering drum has an upper deck, a lower deck, and a metering chamber therebetween. The metering chamber has an entrance aperture in the lower deck and an exit aperture in the upper deck. The metering drum is rotatable relative to the dispensing cap between a filling position, where the metering chamber is aligned with the dispensing aperture and dry product fills the chamber, and a dispensing position where the metering chamber is not aligned with the dispensing aperture and dry product can be dispensed. The dispensing cap and the metering drum include formations to index a position of the metering drum.

6 Claims, 17 Drawing Sheets

(51) Int. Cl.
*A47J 47/01* (2006.01)
*G01F 11/00* (2006.01)

(56) References Cited

U.S. PATENT DOCUMENTS

| | | | |
|---|---|---|---|
| 3,129,853 A | 4/1964 | Hoskins | |
| 3,179,303 A | 4/1965 | Dankoff et al. | |
| 3,201,004 A | 8/1965 | Plonski | |
| 3,207,371 A | 9/1965 | Stone | |
| 3,270,886 A | 9/1966 | Sackett | |
| 3,311,264 A | 3/1967 | Cayer | |
| 3,347,425 A | 10/1967 | Beushausen et al. | |
| 3,695,487 A | 10/1972 | Slayton et al. | |
| 3,973,704 A | 8/1976 | Horowitz | |
| 4,032,050 A | 6/1977 | Funk | |
| 4,071,171 A | 1/1978 | Bassignani | |
| 4,162,751 A | 7/1979 | Hetland et al. | |
| 4,174,058 A | 11/1979 | Bassignani | |
| 4,257,541 A | 3/1981 | Souza | |
| 4,345,700 A | 8/1982 | Souza | |
| 4,500,016 A * | 2/1985 | Funfstuck | B65D 47/265 222/153.14 |
| 4,560,092 A | 12/1985 | Souza | |
| 4,674,660 A | 6/1987 | Botto | |
| 4,705,196 A | 11/1987 | Jang | |
| 4,832,235 A * | 5/1989 | Palmer | 222/370 |
| 4,961,521 A | 10/1990 | Eckman | |
| 5,111,976 A | 5/1992 | Ban | |
| 5,275,130 A | 1/1994 | Muckler | |
| 5,330,082 A | 7/1994 | Forsyth | |
| 5,339,993 A | 8/1994 | Groya et al. | |
| 5,465,871 A | 11/1995 | Robbins, III | |
| 5,477,895 A | 12/1995 | Willard | |
| 5,509,582 A | 4/1996 | Robbins, III | |
| 5,547,109 A | 8/1996 | Robbins, III | |
| 5,588,563 A | 12/1996 | Liu | |
| 5,601,213 A * | 2/1997 | Daniello | 222/456 |
| 5,645,197 A | 7/1997 | Chen | |
| 5,676,282 A | 10/1997 | Satterfield | |
| 5,772,086 A | 6/1998 | Krafft | |
| D410,383 S | 6/1999 | Tarashchansky | |
| 5,934,516 A | 8/1999 | Strycharske et al. | |
| 5,937,920 A | 8/1999 | Simmel et al. | |
| 6,269,971 B1 | 8/2001 | Nystrom et al. | |
| 6,283,339 B1 | 9/2001 | Morrow | |
| 6,299,033 B1 * | 10/2001 | VerWeyst et al. | 222/480 |
| 6,550,640 B2 | 4/2003 | Smith | |
| 6,601,734 B1 * | 8/2003 | Smith | 222/142.9 |
| 7,007,830 B2 * | 3/2006 | Parve et al. | 222/556 |
| 7,090,098 B2 | 8/2006 | Livingston et al. | |
| 7,121,438 B2 * | 10/2006 | Hoepner et al. | 222/544 |
| 7,451,901 B2 | 11/2008 | Ranney | |
| 7,748,579 B1 | 7/2010 | Shin | |
| 2005/0023304 A1 * | 2/2005 | Vogel et al. | 222/480 |
| 2010/0140304 A1 * | 6/2010 | Walunis et al. | 222/480 |
| 2010/0230446 A1 * | 9/2010 | Daggett | 222/480 |

\* cited by examiner

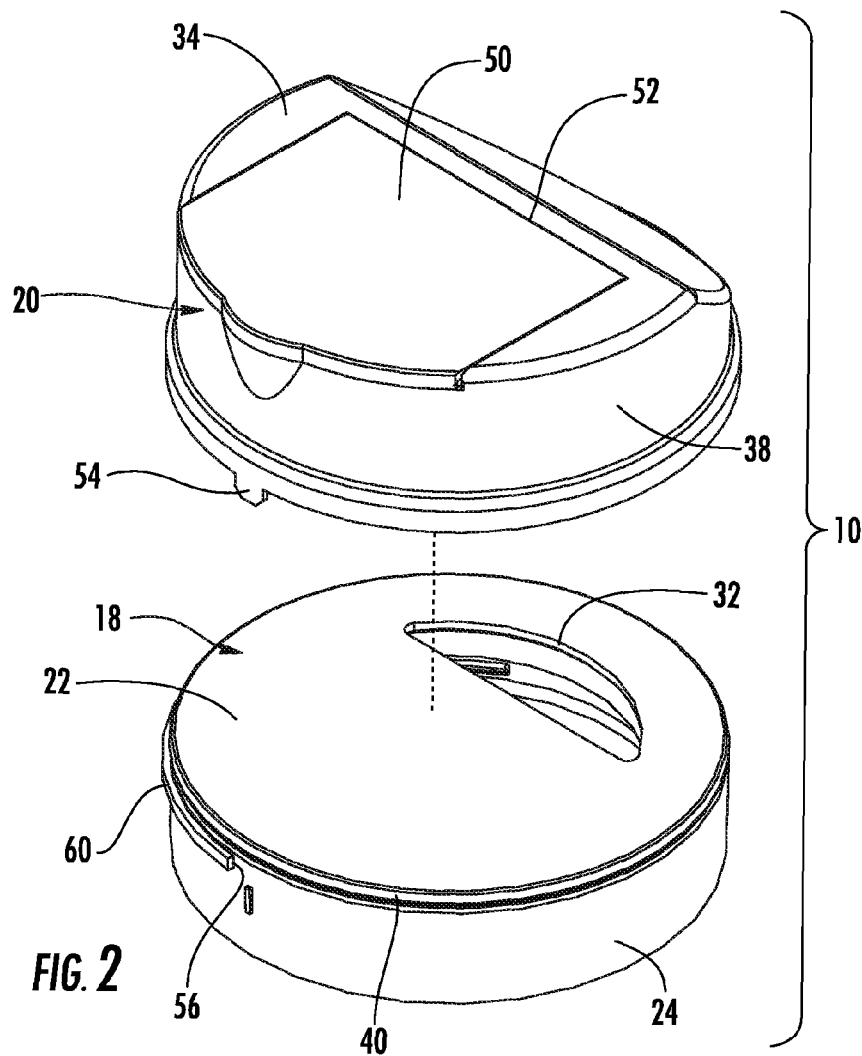
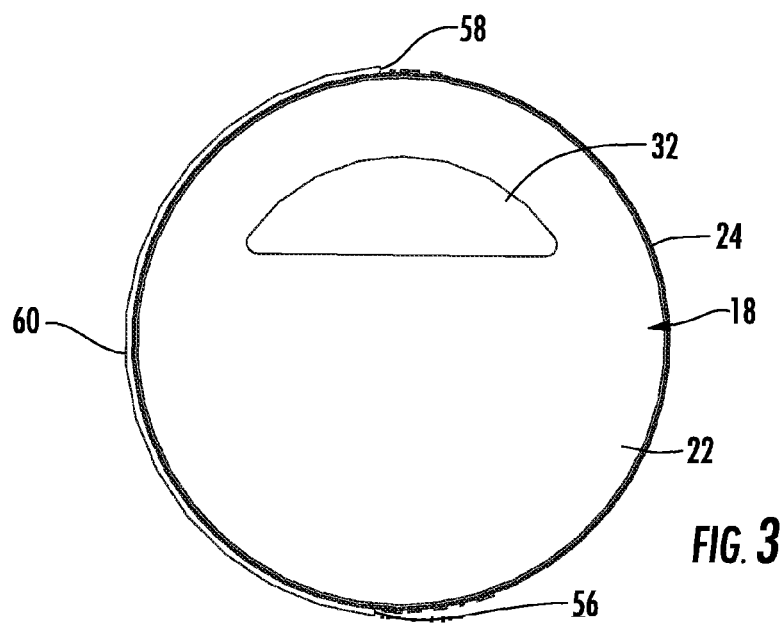

METERED DISPENSING CLOSURE WITH INDEXING FORMATIONS

BACKGROUND

The present disclosure relates to a dispensing closure and more particularly to a dispensing closure for dispensing a metered amount of a dry product from a container.

SUMMARY

A first exemplary embodiment of a dispensing closure in accordance with the teachings herein is operable for dispensing a single metered amount of a dry product from a container. The dispensing closure includes a dispensing cap and a metering drum rotatably mounted on the dispensing cap.

The dispensing cap has an upper deck, an outer skirt depending downwardly from the upper deck, and an inner skirt having an inner surface configured and arranged to engage an outer surface of a neck of the container. In this arrangement, the inner skirt is snap received onto the neck of the container. The upper deck includes a dispensing aperture to allow a flow of the dry product from the container.

The metering drum has an upper deck, a lower deck, and an outer skirt extending between the upper and lower decks. The metering drum is rotatably mounted on the dispensing cap wherein the lower deck of the metering drum is disposed in facing relation with the upper deck of the dispensing cap. The metering drum also has a metering chamber extending between the upper and lower decks, the metering chamber having an entrance aperture in the lower deck and an exit aperture in the upper deck. The metering drum further includes a lid hingeably secured to the metering drum to selectively open and close the exit aperture on the top of the metering chamber.

In operation, the metering drum is selectively rotatable relative to the dispensing cap from a normal dispensing position to a filling position, wherein the metering chamber is then rotationally aligned with the dispensing aperture and a metered amount the dry product can flow from the container into the metering chamber. The lid remains in the closed position and the container is inverted to allow product to fill the metering chamber. When the metering chamber is full, the metering chamber is rotated back to the dispensing position wherein the metering chamber is no longer rotationally aligned with the dispensing aperture. In this regard, the upper deck of the dispensing cap forms a bottom wall to the metering chamber in the dispensing position. In the dispensing position, the metered amount of the dry product can then be selectively dispensed from the metering chamber when the lid is opened.

In order to accurately position the metering drum in the filling and dispensing positions, the dispensing cap and the metering drum include complementary indexing formations which positively index the metering drum in the filling position and the dispensing position. More specifically, the metering drum includes an indexing tab extending downwardly from a peripheral lower edge of the outer skirt which overlaps an outer surface of the skirt of the dispensing cap, while the dispensing cap includes indexing ridges corresponding to the filling position and the dispensing position. When the metering drum is rotated, the indexing tab engages with the indexing ridges to index the metering drum in the respective position.

A second exemplary embodiment is operable for dispensing two different metered amounts of a dry product from the container. The dual metering dispensing closure includes a dispensing cap and a metering drum.

The dispensing cap has an upper deck and an outer skirt depending downwardly from the upper deck. The outer skirt has an inner surface configured and arranged to engage an outer surface of the neck of the container. In this arrangement, the inner surface includes inwardly extending threads which threadably engage with outwardly extending threads on the outer surface of the neck. The upper deck includes a dispensing aperture to allow a flow of the dry product from said container into the metering drum.

The metering drum has an upper deck, a lower deck, and an outer skirt extending between the upper and lower decks. The metering drum is rotatably mounted on the dispensing cap with the lower deck of the metering drum disposed in facing relation with the upper deck of the dispensing cap. The metering drum has a first metering chamber extending between the upper and lower decks, the first metering chamber having a first volume and further having an entrance aperture in the lower deck and an exit aperture in the upper deck. The metering drum also has a second metering chamber extending between the upper and lower decks, the second metering chamber having a second volume and further having an entrance aperture in the lower deck and an exit aperture in the upper deck. A first lid is hingeably secured to the metering drum to selectively open and close the exit aperture of the first metering chamber and a second lid is hingeably secured to the metering drum to selectively open and close the exit aperture of the second metering chamber.

In operation the metering drum is selectively rotatable relative to the dispensing cap from a normal dispensing position to a first filling position, wherein the first metering chamber becomes rotationally aligned with the dispensing aperture and a first metered amount of the dry product can flow from the container into the first metering chamber. The first lid remains in the closed position and the container is inverted to allow product to fill the first metering chamber.

The metering drum is also selectively rotatable to a second filling position wherein the second metering chamber is rotationally aligned with the dispensing aperture and a second metered amount the dry product can flow from the container into the second metering chamber. As indicated above, the second lid remains in the closed position and the container is inverted to allow product to fill the second metering chamber.

When either of the first or second metering chambers is full, the metering drum is rotatable back to the dispensing position wherein neither the first metering chamber nor the second metering chamber is rotationally aligned with the dispensing aperture. In this regard, the upper deck of the dispensing cap forms a bottom wall to both the first and second metering chambers in the third dispensing position. The metered amounts of the dry product can then be selectively dispensed from either the first or second metering chamber when the first or second lids are opened.

In order to accurately position the metering drum in the filling and dispensing positions, the dispensing cap and the metering drum include complementary indexing formations which positively index the metering drum in the first and second filling positions and the dispensing position. More specifically, the metering drum includes an indexing tab extending downwardly from a peripheral lower edge of the skirt which overlaps an outer surface of the skirt of the dispensing cap. The dispensing cap includes indexing ridges corresponding to the first and second filling positions and the dispensing position. When the metering drum is rotated, the indexing tab engages with the indexing ridges to index the metering drum in the respective position.

A third exemplary embodiment is also operative for dispensing two different metered amounts of a dry product from the container, and further includes a direct dispense feature which allows the product to the be directly dispensed through a third chamber.

The third embodiment includes a dispensing cap and a metering drum. The dispensing cap has an upper deck and an outer skirt depending downwardly from the upper deck. The outer skirt has an inner surface with inwardly extending threads configured and arranged to engage outwardly extending threads on an outer surface of the neck of the container. The upper deck includes a dispensing aperture to allow a flow of the dry product from the container.

The metering drum has an upper deck, a lower deck, and an outer skirt extending between the upper and lower decks. The metering drum is rotatably mounted on the dispensing cap with the lower deck of the metering drum disposed in facing relation with the upper deck of the dispensing cap. The metering drum has a first metering chamber extending between the upper and lower decks, the first metering chamber having a first volume and further having an entrance aperture in the lower deck and an exit aperture in the upper deck. The metering drum also has a second metering chamber extending between the upper and lower decks, the second metering chamber having a second volume and further having an entrance aperture in the lower deck and an exit aperture in the upper deck. Still further, the metering drum has a third, direct dispense chamber (pass through) extending between the upper and lower deck, the direct dispense chamber having an entrance aperture and an exit aperture. First, second and third lids are hingeably secured to the metering drum to selectively open and close the respective exit apertures of the first metering chamber, the second metering chamber and the third direct dispense chamber.

In operation, the metering drum of the third embodiment is also selectively rotatable relative to the dispensing cap from a normal dispensing position to a first filling position, wherein the first metering chamber is rotationally aligned with the dispensing aperture and a first metered amount the dry product can flow from the container into the first metering chamber. The first lid remains in the closed position and the container is inverted to allow product to fill the first metering chamber.

The metering drum is also rotatable to a second filling position wherein the second metering chamber is rotationally aligned with the dispensing aperture and a second metered amount the dry product can flow from the container into the second metering chamber. As indicated above, the second lid also remains in the closed position and the container is inverted to allow product to fill the second metering chamber.

When either of the first or second metering chambers is full, the metering drum is rotatable back to the dispensing position wherein the direct dispense chamber is rotationally aligned with the dispensing aperture. In the dispensing position, the upper deck of the dispensing cap forms a bottom wall to the first and second metering chambers.

The metered amounts of the dry product can then be selectively dispensed from either the first or second metering chambers when the first or second lid is opened. In addition, the dry product can also be selectively dispensed directly from the container through the direct dispense chamber when the third lid is opened.

In order to accurately position the metering drum in the filling and dispensing positions, the dispensing cap and the metering drum include complementary indexing formations which positively index the metering drum in the first and second filling positions and the dispensing position. More specifically, the metering drum includes an indexing tab extending downwardly from a peripheral lower edge of the skirt which overlaps an outer surface of the skirt of the dispensing cap. The dispensing cap includes indexing ridges corresponding to the first and second filling positions and the dispensing position. When the metering drum is rotated, the indexing tab engages with the indexing ridges to index the metering drum in the respective position.

Objectives, features and advantages of the embodiments shall become apparent as the description thereof proceeds when considered in connection with the accompanying illustrative drawings.

BRIEF DESCRIPTION OF THE DRAWING FIGURES

In the drawings which illustrate several exemplary modes for carrying out the present invention:

FIG. 2 is an exploded perspective view thereof;

FIG. 3 is a top view of the dispensing cap thereof;

DETAILED DESCRIPTION OF A PREFERRED EMBODIMENT

Figure 1:
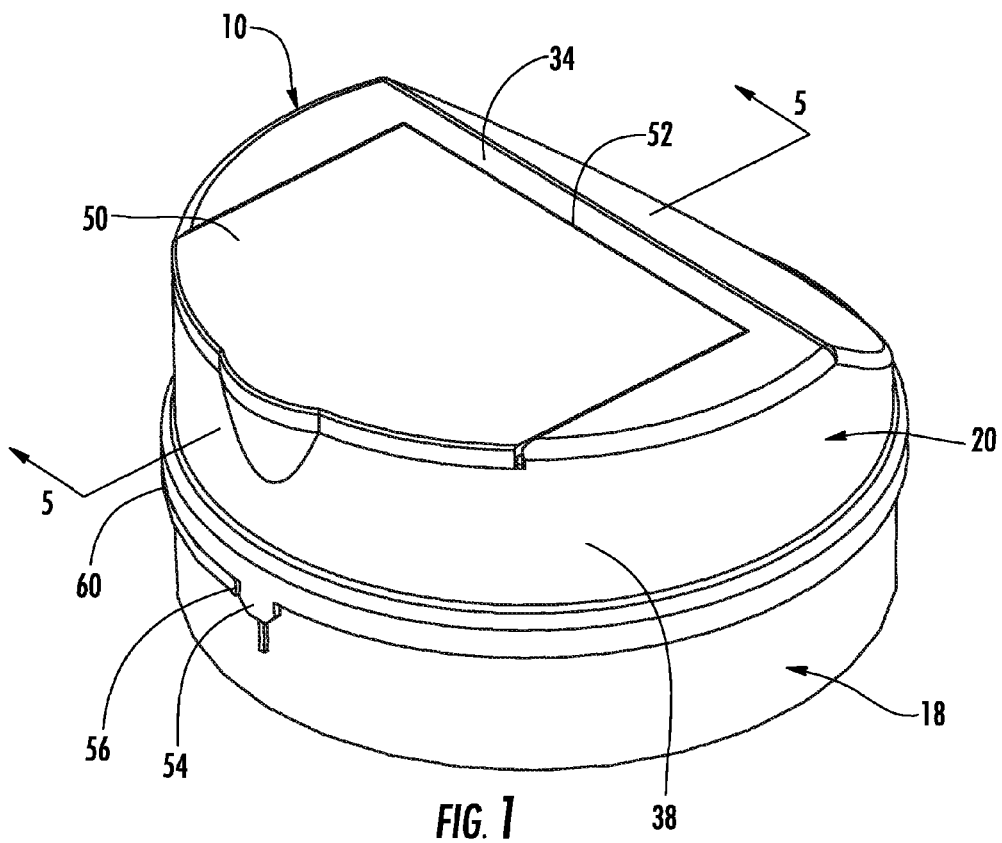
FIG. 1 is a perspective view of a first exemplary embodiment with the metering drum in the dispensing position.

Referring now to the drawings, a first exemplary embodiment is illustrated and generally indicated at 10 in FIGS. 1-8.

Figure 1A:
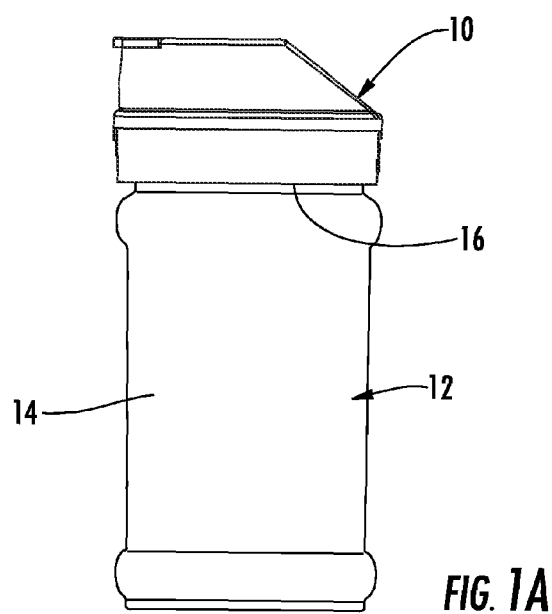
FIG. 1A is a side view of the dispensing closure mounted onto the neck of a dry product container.

As will hereinafter be more fully described, a first exemplary embodiment of a dispensing closure in accordance with the teachings herein is operable for dispensing a single metered amount of a dry product from a container 12 (FIG. 1A).

For purposes of the present disclosure, a dry product is defined as a powdered or granular material which is flowable from container 12 by means of gravity. Non-limiting examples of dry product include spices, granulated sugar, powdered or granulated detergents, and powdered or granulated chemicals or minerals. Although, the metered dispensing closures as illustrated herein were developed for the spice industry and contain markings and measurements reflecting that industry, the concepts disclosed herein are equally applicable for any dry product.

Container 12 generally comprises any container suitable for holding a powdered or granular dry material. The container includes a body portion 14 having an interior volume, and a neck 16. In the exemplary embodiment, the container 12 is molded from any suitable plastic material which preserves and keeps the dry product from contamination of any kind.

Dispensing closure 10 includes a dispensing cap generally indicated at 18 and a metering drum generally indicated at 20 which is rotatably mounted on the dispensing cap 18. In the exemplary embodiments herein, the individual parts and components are molded from suitable plastic materials.

Figure 5:
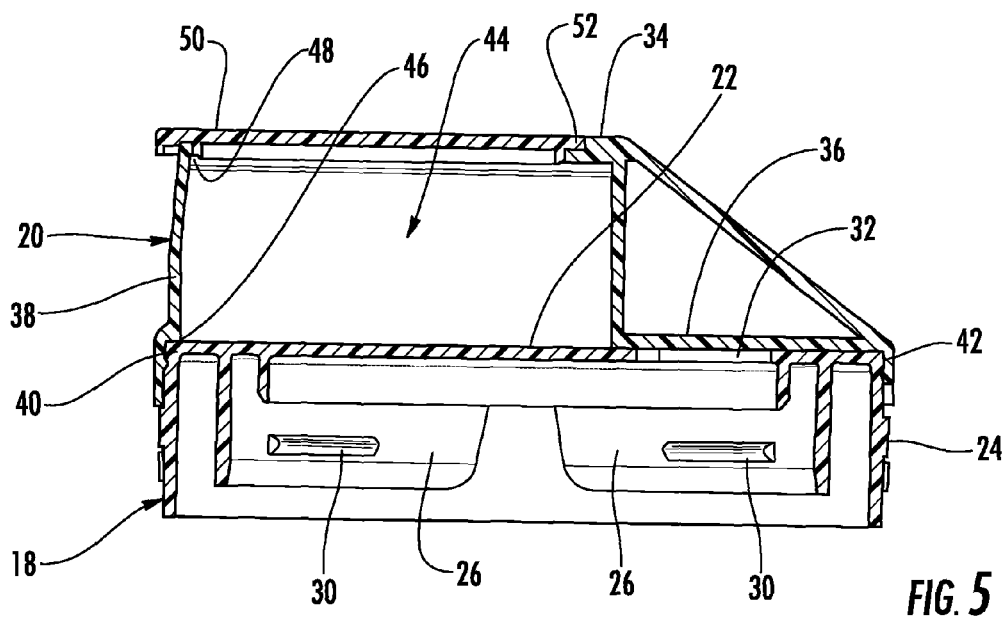
FIG. 5 is a cross-sectional view thereof taken along line 5-5 of FIG. 1.

Referring to FIGS. 2, 3 and 5, the dispensing cap 18 has a planar upper deck 22, an outer skirt 24 depending downwardly from the upper deck 22, and an inner skirt 26 having an inner surface 28 configured and arranged to engage an outer surface of the neck 16 of the container 12. In this arrangement, the inner skirt 26 includes snap ridges 28 which are snap received over complementary snap ridges (not shown) formed on the neck 16 of the container 12. The snap ridge connection between the dispensing cap 18 and the container neck 16 is intended to be "permanent". However, it will be understood that the dispensing cap 18 could indeed be removed with a sufficient amount of physical force. The upper deck 22 includes a shaped dispensing aperture 32 which allows a flow of the dry product from the container 12. As explained above, it is to be understood that the dry product will freely flow through the dispensing aperture 32 when the container 12 is inverted.

Figure 4:
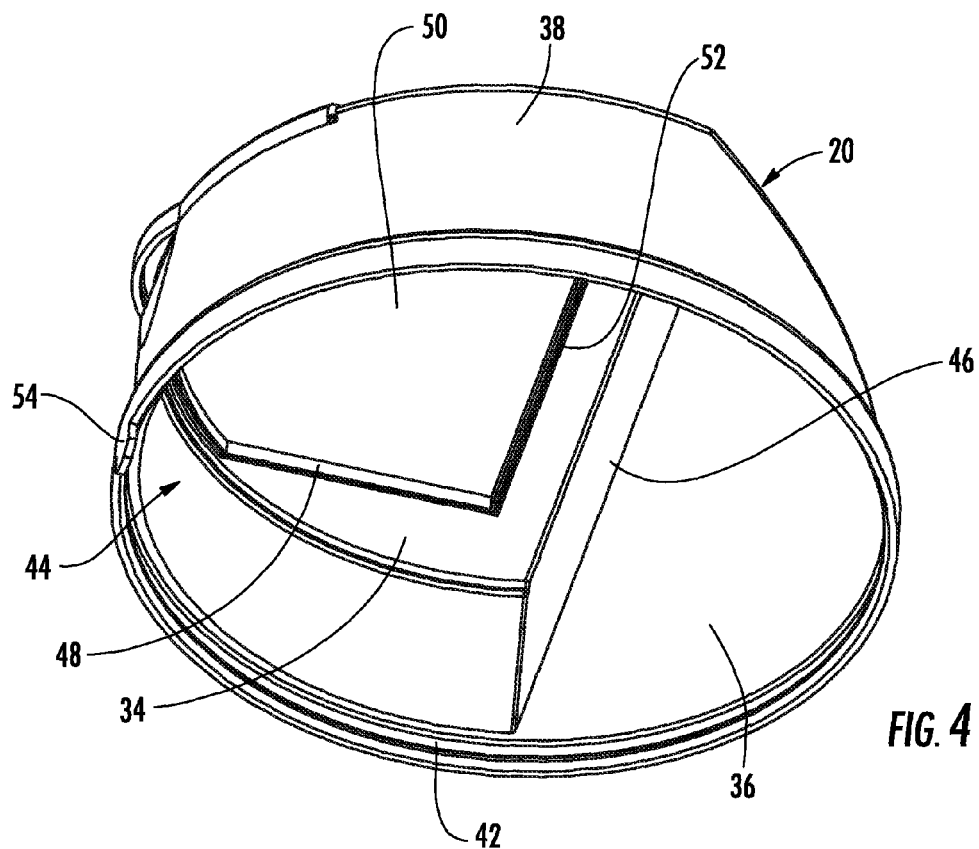
FIG. 4 is a bottom perspective view of the metering drum thereof.

Referring to FIGS. 2 and 4, the metering drum 20 has an upper deck 34, a planar lower deck 36, and an outer skirt 38 extending between the upper and lower decks 34,36. The metering drum 20 is rotatably mounted on the dispensing cap 18 wherein the lower deck 36 of the metering drum 20 is disposed in facing relation with the upper deck 22 of the dispensing cap 18 (see FIG. 5). The rotatable connection between the metering drum 20 and the dispensing cap 18 is provided by a continuous, outwardly extending snap bead 40 formed on the outer surface of the skirt 24 of the dispensing cap 18, and a complementary continuous, snap groove 42 formed on an inner surface of the outer skirt 38 of the metering drum 20. The snap groove 42 is snap received over the snap bead 40 to hold the dispensing cap 18 and metering drum 20 together in a friction fit, yet allows a relative sliding rotation of the parts.

Referring to FIGS. 4 and 5, the metering drum 20 includes a metering chamber 44 extending between the upper and lower decks 34,36, the metering chamber 44 having an entrance aperture 46 in the lower deck 36 and an exit aperture 48 in the upper deck 34.

Figure 8:
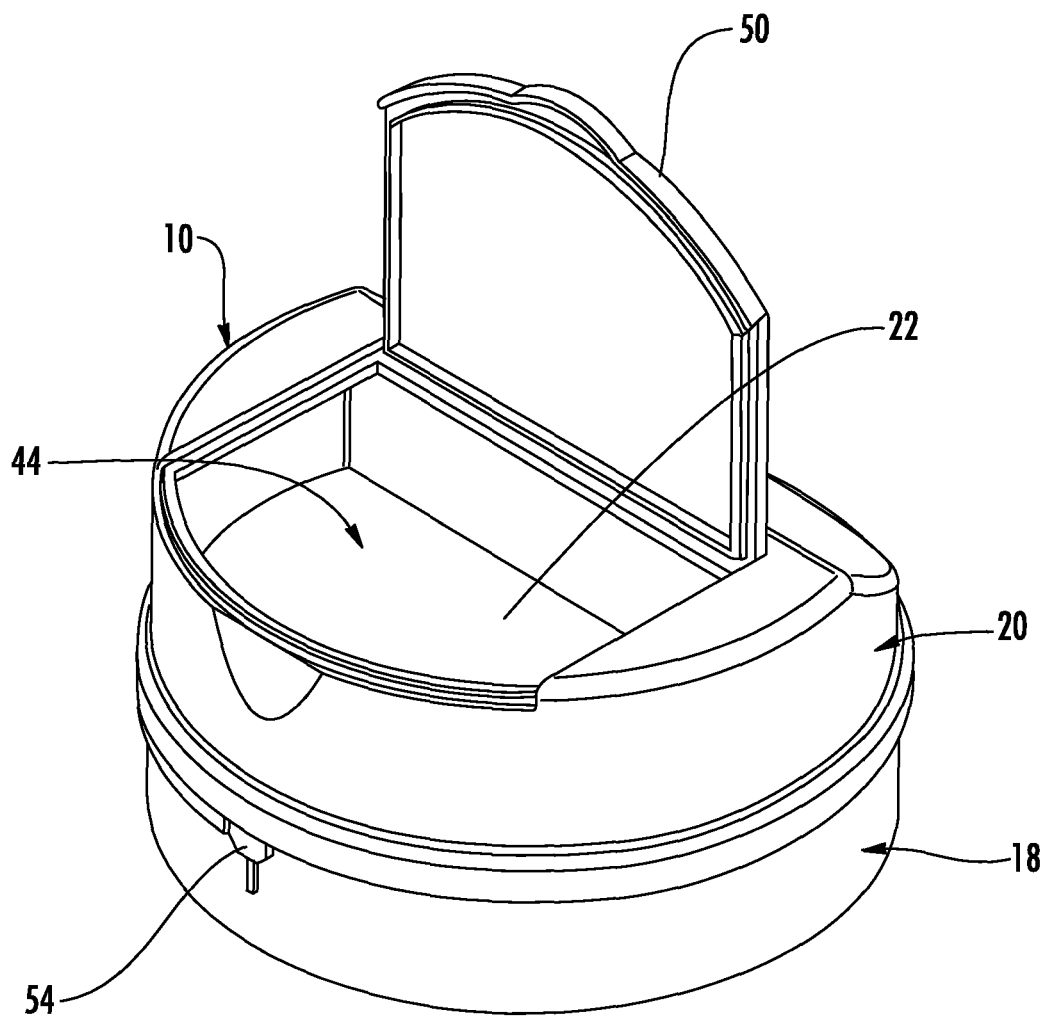
FIG. 8 is another perspective view thereof with the lid in the open position.

Referring to FIGS. 1 and 8, the metering drum 20 further includes a lid 50 hingeably secured to the metering drum 20 to selectively open and close the exit aperture 48 on the top of the metering chamber 44. In the exemplary embodiment, the lid 50 is connected to the upper deck 34 of the metering drum 20 by means of a living hinge structure 52.

Figure 6:
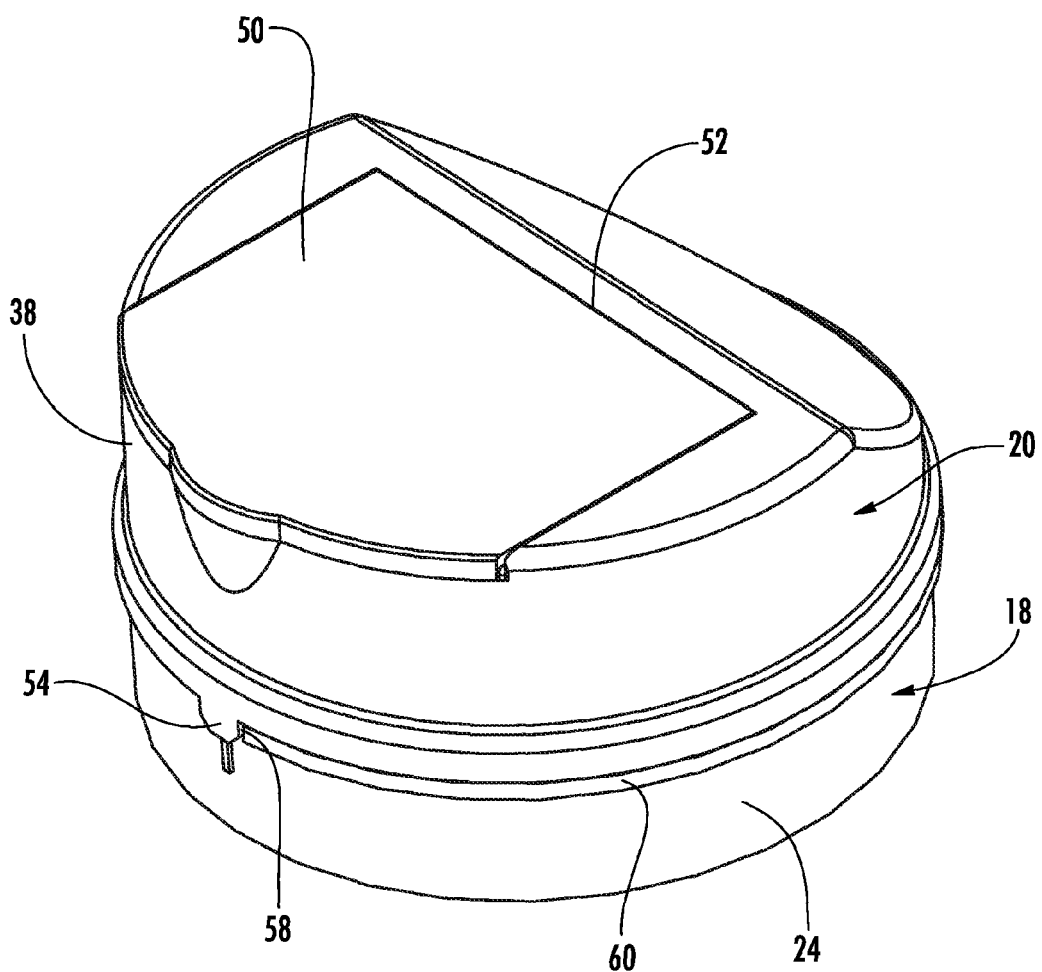
FIG. 6 is a perspective view thereof with the metering drum rotated to the filling position.
Figure 7:
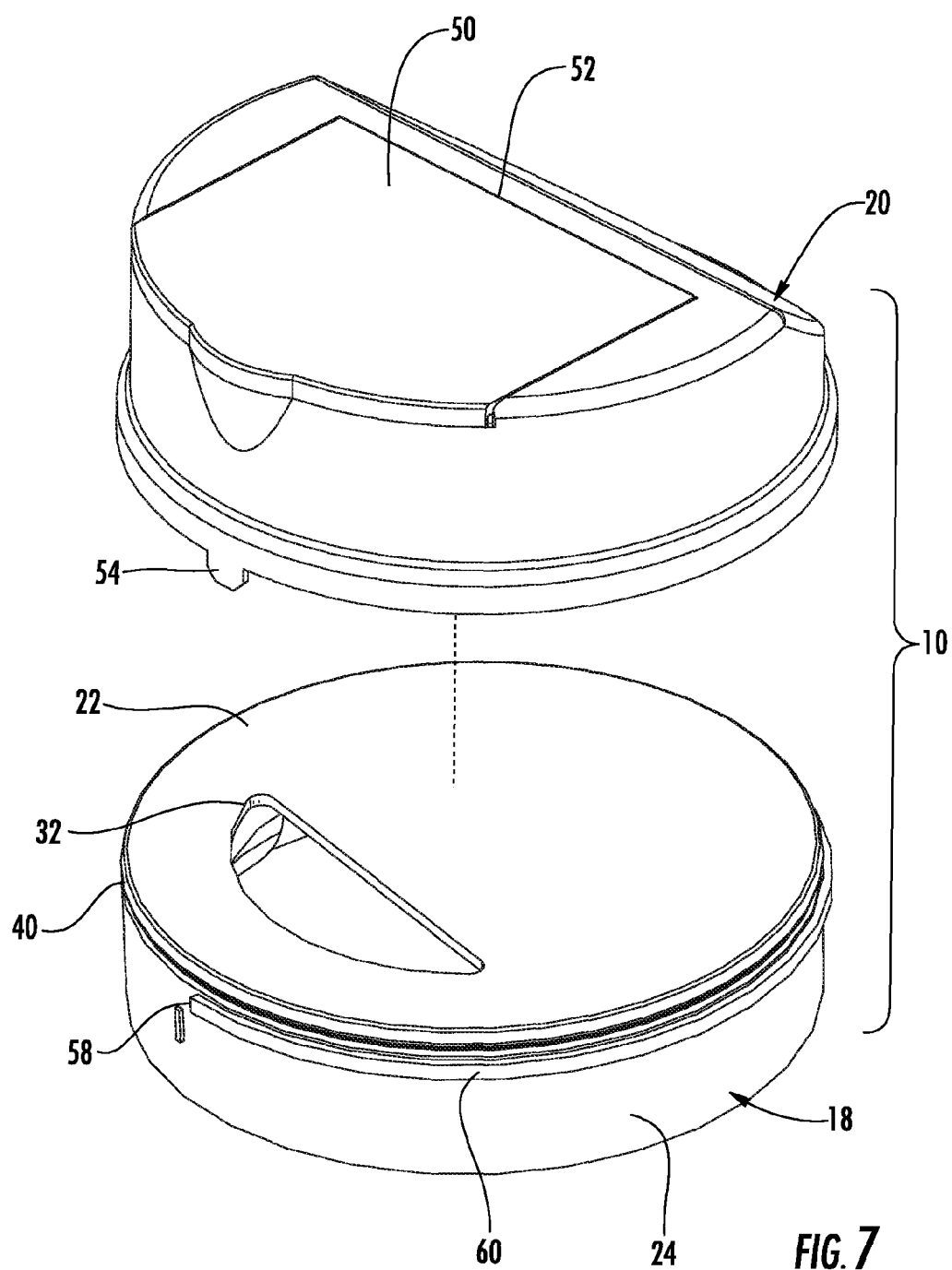
FIG. 7 is an exploded perspective view thereof.

In operation, the metering drum 20 is selectively rotatable relative to the dispensing cap 18 from a normal dispensing position (FIGS. 1, 2 and 8) to a filling position (FIGS. 6-7). The outer surface of the dispensing cap is provided with indicia to identify the positions. As can be best seen in FIG. 7, the metering chamber 44 (beneath the lid 50) is then rotationally aligned with the dispensing aperture 32 and a metered amount the dry product can flow from the container 12 into the metering chamber 44. In use, the lid 50 remains in the closed position and the container 12 is inverted to allow product to fill the metering chamber 44. A slight shake of the container 12 may be needed for leveling the dry product in the metering chamber 44. When the metering chamber 44 is full, the metering drum 20 is rotated back to the dispensing position (while the container 12 is still inverted), where the metering chamber 40 is no longer rotationally aligned with the dispensing aperture 32 (See FIG. 2). In this regard, the upper deck 22 of the dispensing cap 18 forms a bottom wall to the metering chamber 44 in the dispensing position (See FIG. 5). In the dispensing position, the metered amount of the dry product can then be selectively dispensed from the metering chamber 44 when the lid 50 is opened (See FIG. 8).

Direct dispense of dry product from the container 12 can be accomplished by rotating the metering drum 20 to the filling position (FIG. 6), and then opening the lid 50, whereby the dry product can flow into the metering chamber 44 and subsequently through the exit aperture 48 of the metering chamber 44.

In order to accurately position the metering drum 20 in the filling and dispensing positions, the dispensing cap 18 and the metering drum 20 include complementary indexing formations which positively index the metering drum 20 in the filling position and the dispensing position. More specifically, the metering drum 20 includes an indexing tab 54 extending downwardly from a peripheral lower edge of the outer skirt 38 which overlaps an outer surface of the outer skirt 24 of the dispensing cap 18, while the dispensing cap 18 includes indexing ridges corresponding to the filling position and the dispensing position. In the exemplary embodiment, the indexing ridges comprise the opposing end walls 56, 58 of a raised shoulder 60 extending outwardly from the outer surface of the outer skirt 24 of the dispensing cap 18. When the metering drum 20 is rotated, the indexing tab 54 engages with the end walls 56,58 to locate the metering drum 20 in the respective position.

Turning to FIGS. 9-16, a second exemplary embodiment is generally indicated at 100 and is operable for dispensing two different metered amounts of a dry product from the container 12.

Generally, the dual metering dispensing closure 100 includes a dispensing cap generally indicated at 102 and a metering drum generally indicated at 104.

Figure 10:
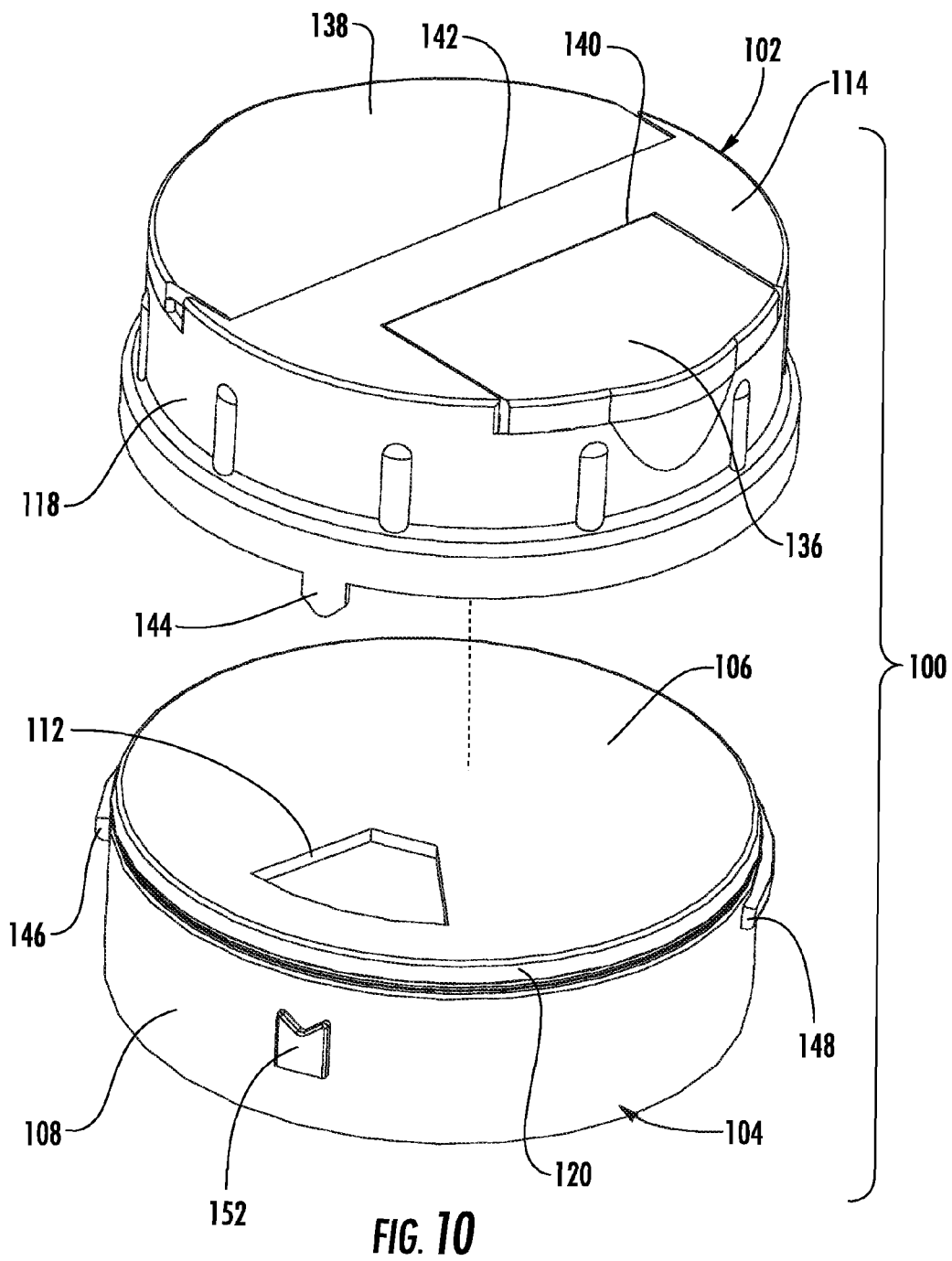
FIG. 10 is an exploded perspective view thereof.
Figure 11:
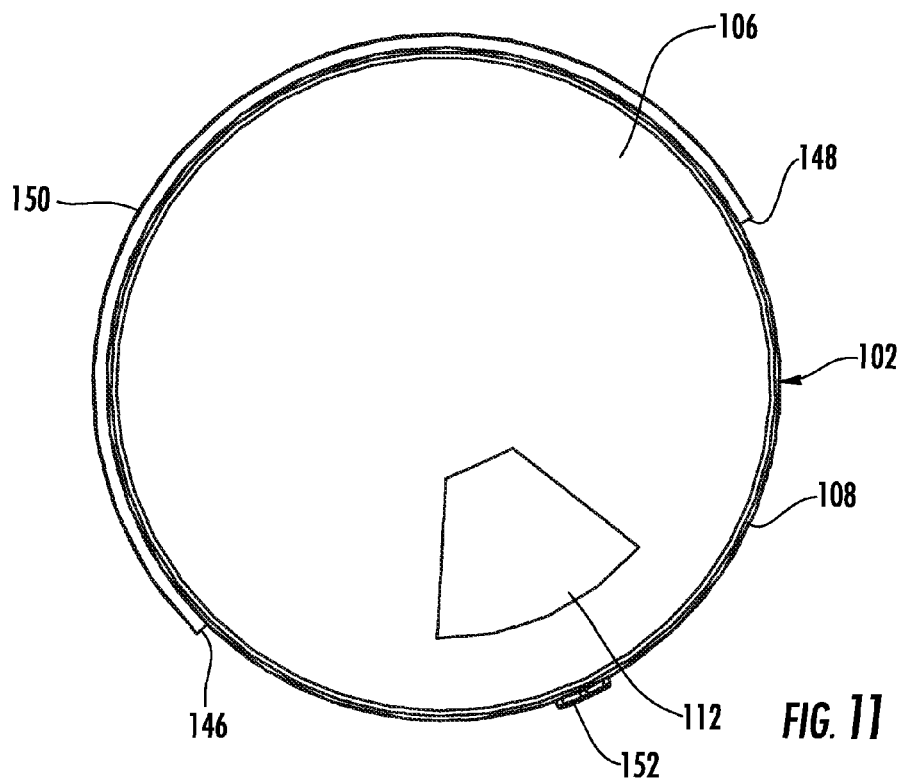
FIG. 11 is a top view of the dispensing cap thereof.
Figure 13:
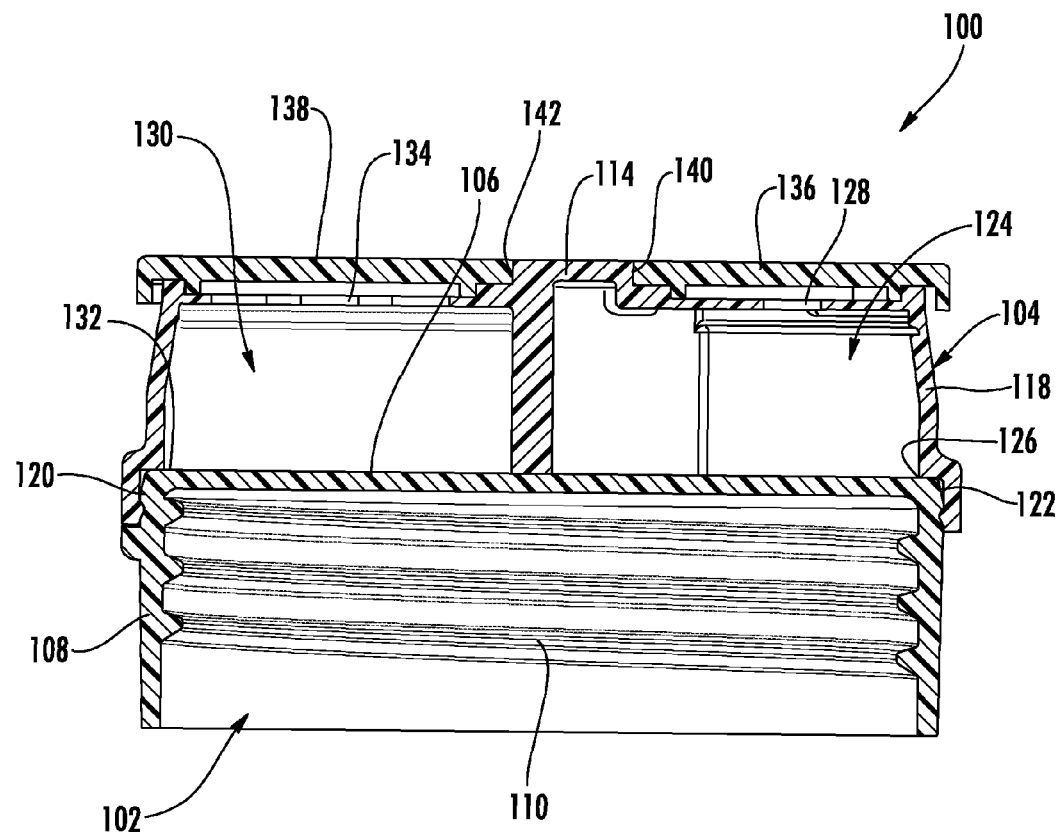
FIG. 13 is a cross-sectional view thereof taken along line 13-13 of FIG. 9.
Figure 15:
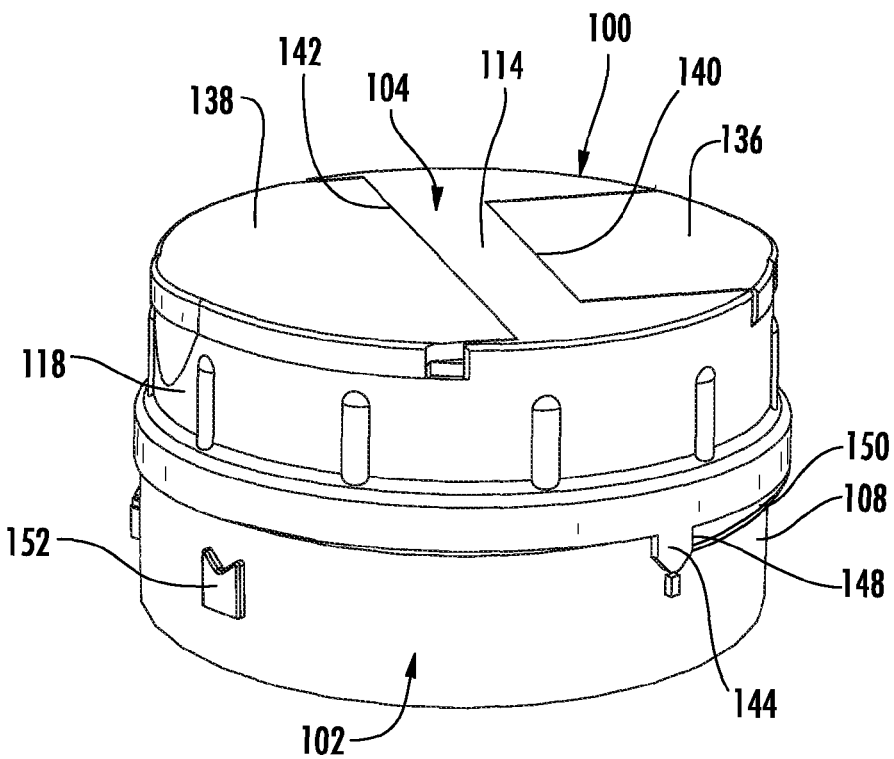
FIG. 15 is a perspective view thereof with the metering drum rotated to a second filling position.
Figure 14:
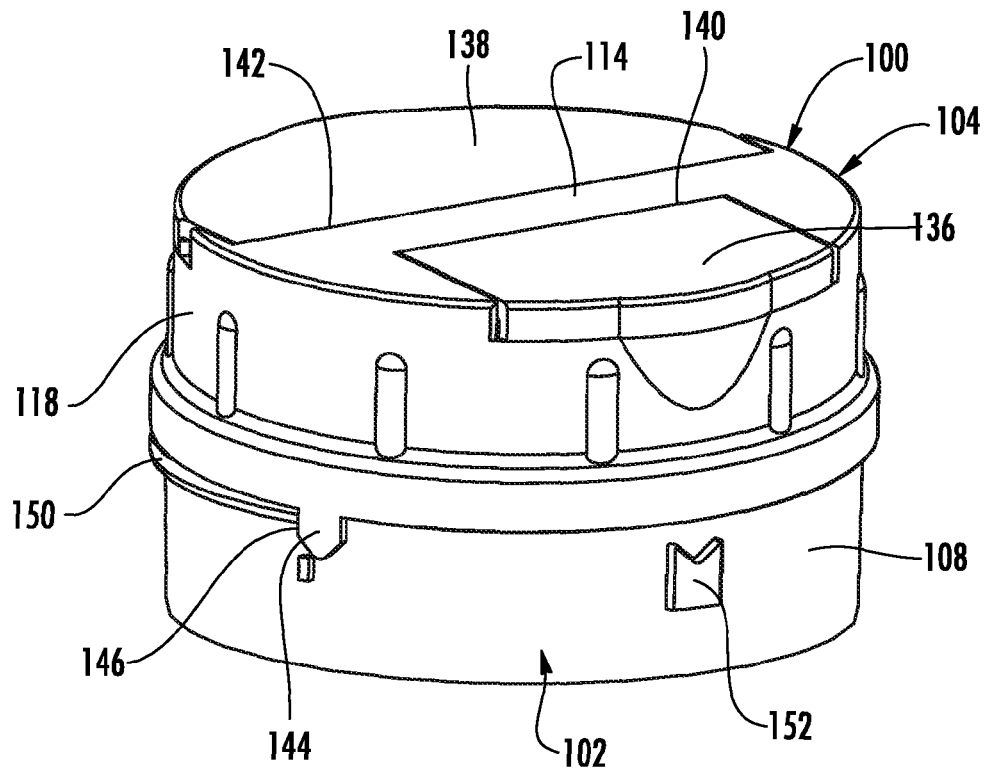
FIG. 14 is a perspective view thereof with the metering drum rotated to a first filling position.

Referring to FIGS. 10, 11 and 13, the dispensing cap 102 has a planar upper deck 106 and an outer skirt 108 depending downwardly from the upper deck 106. The outer skirt 108 has an inner surface configured and arranged to engage an outer surface of the neck 16 of the container 12. In this arrangement, the inner surface includes inwardly extending threads 110 which threadably engage with outwardly extending threads (not shown) on an outer surface of the neck 16 of the container 12. The upper deck 106 includes a shaped dispensing aperture 112 which allows a flow of the dry product from the container 12 into the metering drum 104.

Figure 12:
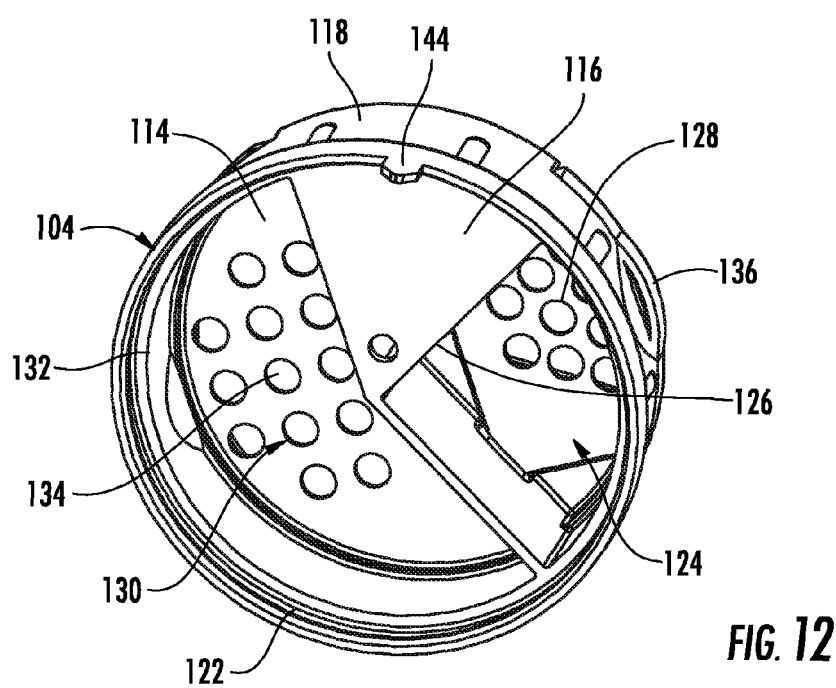
FIG. 12 is a bottom perspective view of the metering drum thereof.

Referring to FIGS. 10, 12 and 13, the metering drum 104 has an upper deck 114, a planar lower deck 116, and an outer skirt 118 extending between the upper and lower decks 114, 116. The metering drum 104 is rotatably mounted on the dispensing cap 102 with the lower deck 116 of the metering drum 104 disposed in facing relation with the upper deck 106 of the dispensing cap 102 (See FIG. 13). As described hereinabove, the rotatable connection between the metering drum 104 and the dispensing cap 102 is provided by a continuous, outwardly extending snap bead 120 formed on the outer surface of the skirt 108 of the dispensing cap 102, and a complementary continuous, snap groove 122 formed on an inner surface of the outer skirt 118 of the metering drum 104. The snap groove 122 is snap received over the snap bead 120 to hold the dispensing cap 102 and metering drum 104 together in a friction fit, yet allows a relative sliding rotation of the parts.

Referring to FIG. 12, the metering drum 104 includes a first metering chamber 124 extending between the upper and lower decks 114,116, the first metering chamber 124 having a first volume and further having an entrance aperture 126 in the lower deck 116 and an exit aperture 128 in the upper deck 114. The metering drum 104 also has a second metering chamber 130 extending between the upper and lower decks 114,116, the second metering chamber 130 having a second larger volume and further having an entrance aperture 132 in the lower deck 116 and an exit aperture 134 in the upper deck 114.

Figure 9:
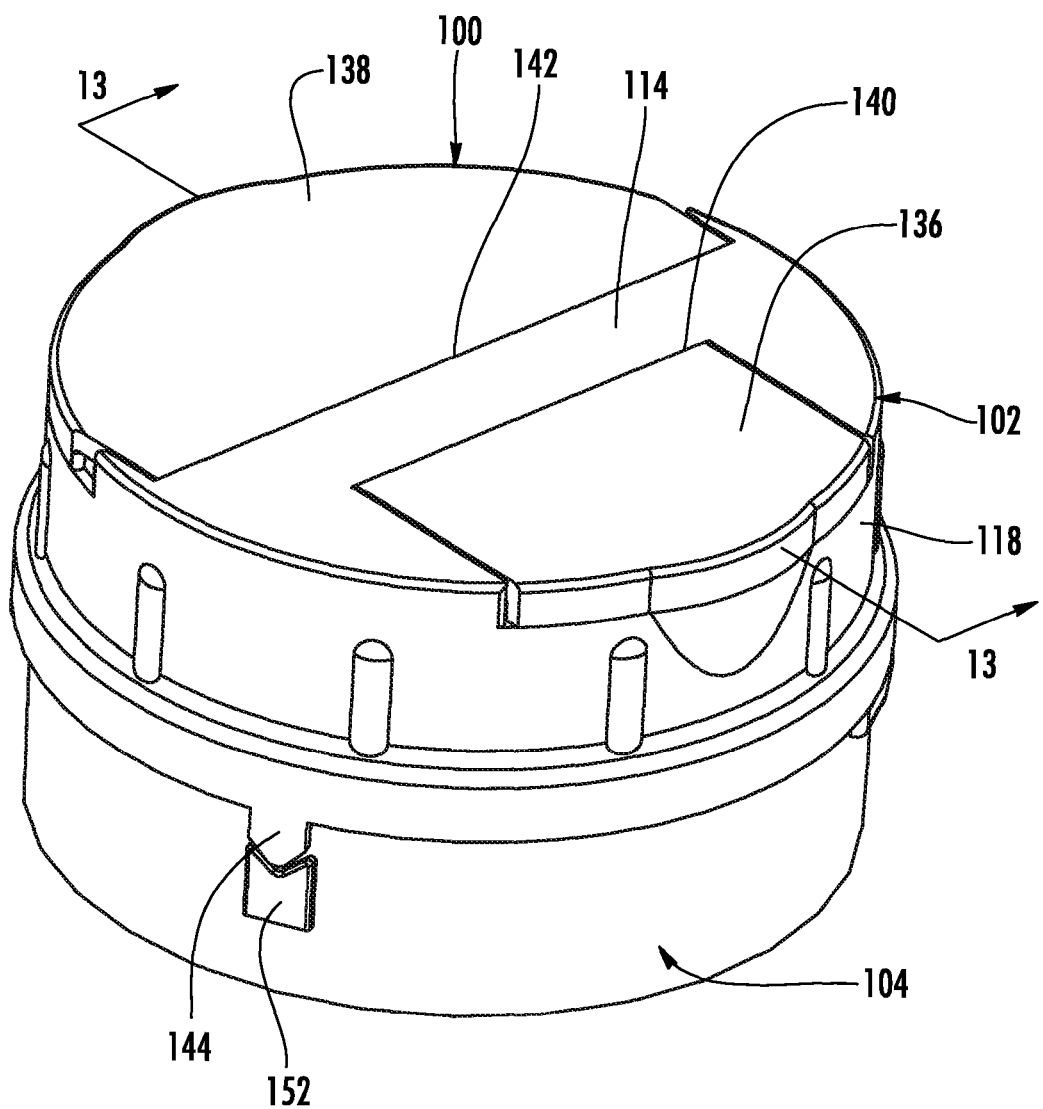
FIG. 9 is a perspective view of a second exemplary embodiment with the metering drum in the dispensing position.
Figure 16:
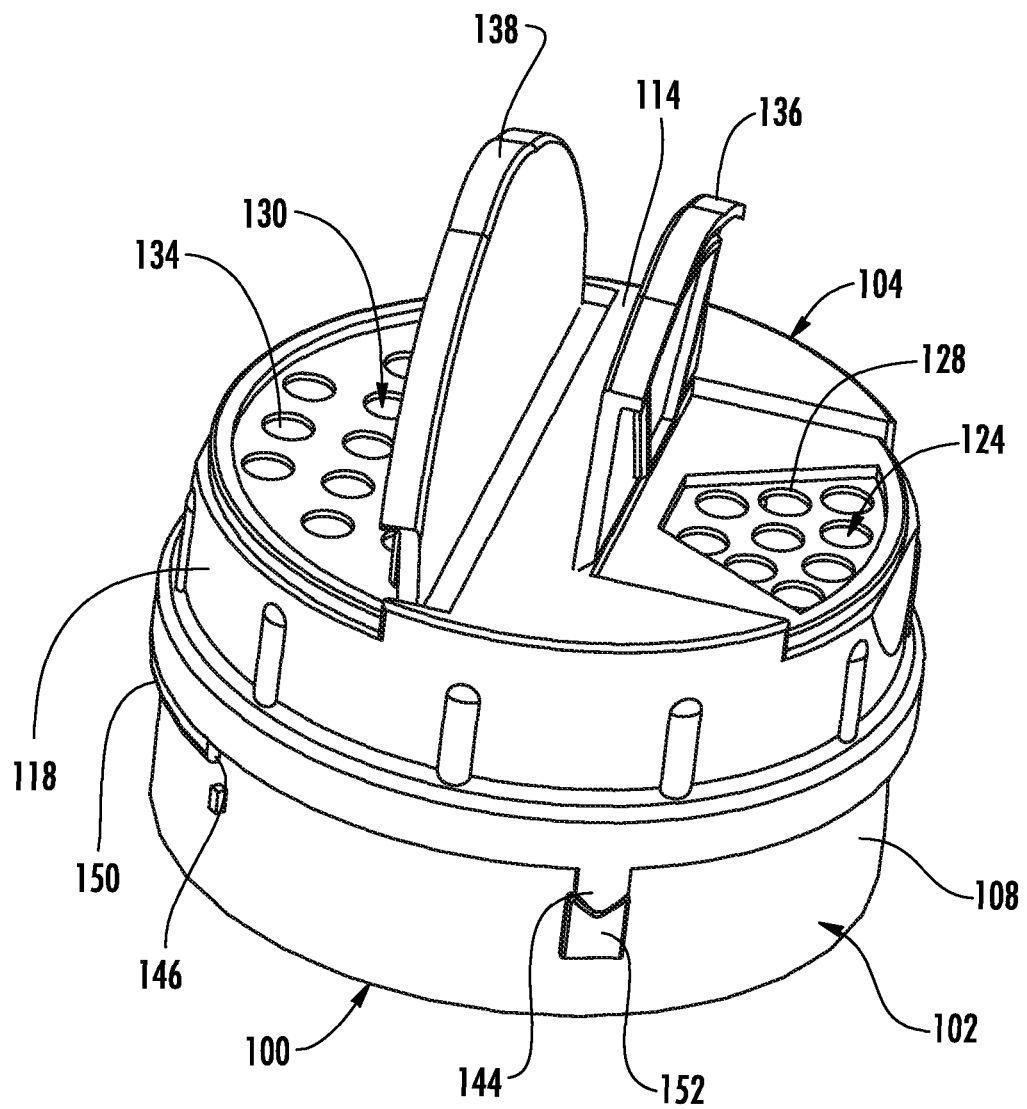
FIG. 16 is another perspective view thereof with the lids in the open position.

Referring to FIGS. 9 and 16, a first lid 136 is hingeably secured to the metering drum 104 to selectively open and close the exit aperture 128 of the first metering chamber 124 and a second lid 138 is hingeably secured to the metering drum 104 to selectively open and close the exit aperture 134 of the second metering chamber 130. In the exemplary embodiment, the first and second lids 136,138 are connected to the metering drum by means of living hinges 140,142.

In operation, the metering drum 104 is selectively rotatable relative to the dispensing cap 102 from a normal dispensing position (FIGS. 9, 10 and 16) to a first filling position (FIG. 14), wherein the first metering chamber 124 becomes rotationally aligned with the dispensing aperture 112 and a first metered amount of the dry product can flow from the container 12 into the first metering chamber 124. In use, the first lid 136 remains in the closed position and the container 12 is inverted to allow product to fill the first metering chamber 124.

The metering drum 104 is also selectively rotatable to a second filling position (FIG. 15) wherein the second metering chamber 130 is rotationally aligned with the dispensing aperture 112 and a second metered amount the dry product can flow from the container 12 into the second metering chamber 130. As indicated above, the second lid 138 remains in the closed position and the container 12 is inverted to allow product to fill the second metering chamber 130.

When either or both of the first or second metering chambers 124,130 is full, the metering drum 104 is rotatable back to the dispensing position (FIG. 9) wherein neither the first metering chamber 124 nor the second metering chamber 130 is rotationally aligned with the dispensing aperture 112 (See also FIG. 10). In this regard, the upper deck 106 of the dispensing cap 102 forms a bottom wall to both the first and second metering chambers 124,130 in the dispensing position (FIG. 13). In the dispensing position, the metered amounts of the dry product can then be selectively dispensed from either the first or second metering chambers 124,130 (or both) when the first or second lids 136,138 are opened.

Direct dispense of dry product from the container 12 can be accomplished by rotating the metering drum 104 to one of the first or second filling positions, and then opening the respective lid 136,138, whereby the dry product can flow into the respective metering chamber 124,130 and subsequently through the exit aperture 128,134 of the respective metering chamber 124,130.

In order to accurately position the metering drum 104 in the filling and dispensing positions, the dispensing cap 102 and the metering drum 104 include complementary indexing formations which positively index the metering drum 104 in the first and second filling positions (FIGS. 14 and 15) and the dispensing position (FIG. 9). More specifically, the metering drum 104 includes an indexing tab 144 extending downwardly from a peripheral lower edge of the skirt 118 which overlaps an outer surface of the skirt 108 of the dispensing cap 102. The dispensing cap 102 includes indexing ridges corresponding to the first and second filling positions and the dispensing position. In this second exemplary embodiment, the indexing ridges corresponding to the first and second filling positions comprise the opposing end walls 146,148 of a raised shoulder 150 extending outwardly from the outer surface of the skirt 108 of the dispensing cap 102. The indexing formation for the dispensing position comprises an independent raised detent 152 (FIGS. 9-10). When the metering drum 104 is rotated, the indexing tab 144 engages with the raised detent 152 and the end walls 146,148 to index the metering drum 104 in the respective position.

Turning to FIGS. 17-24, a third exemplary embodiment is generally indicated at 200, and is also operative for dispensing two different metered amounts of a dry product from the container 12, and further includes a direct dispense feature which allows the product to be directly dispensed through a third chamber (direct dispense).

The third exemplary embodiment 200 includes a dispensing cap generally indicated at 202 and a metering drum generally indicated at 204.

Figure 18:
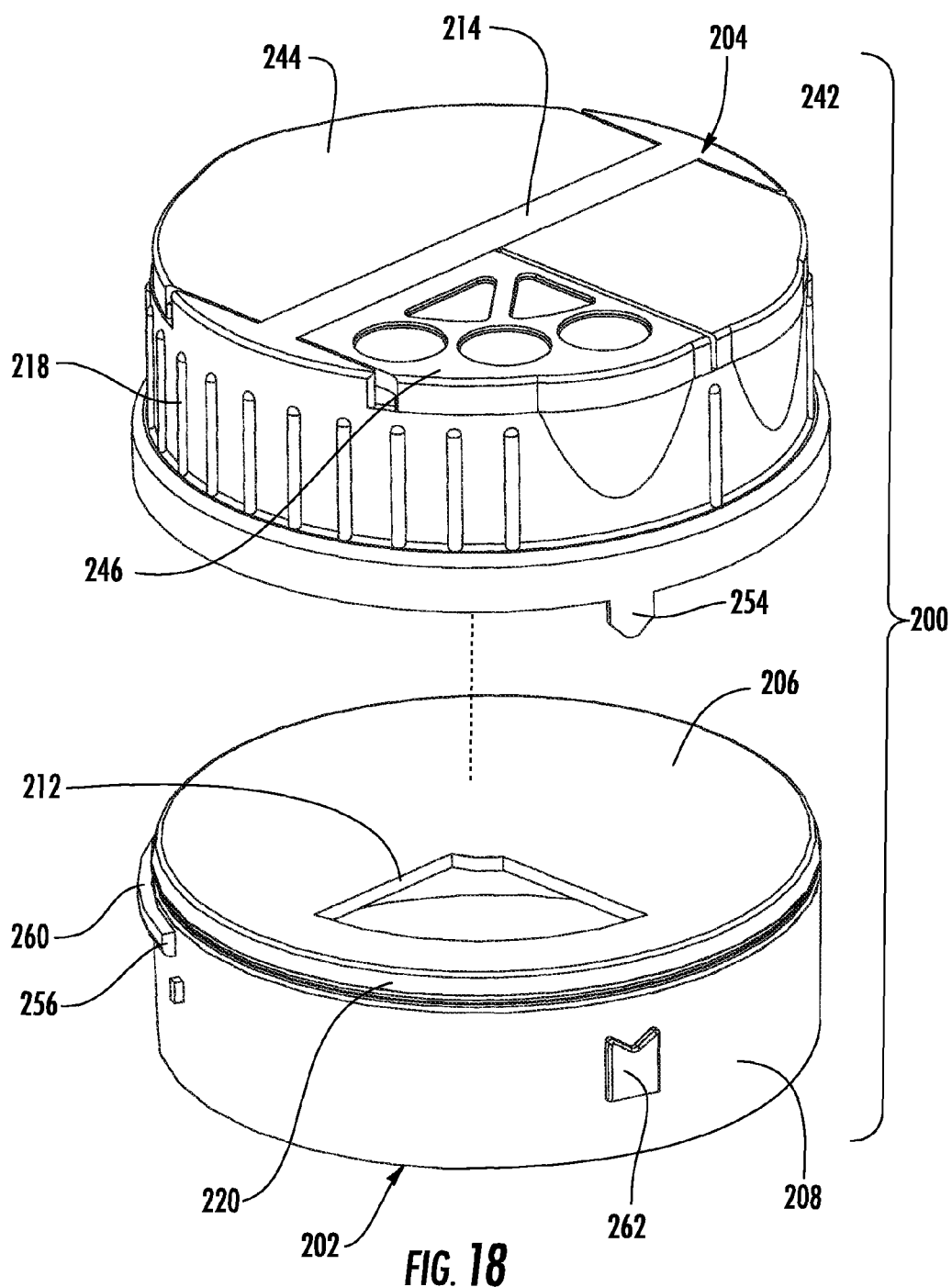
FIG. 18 is an exploded perspective view thereof.
Figure 19:
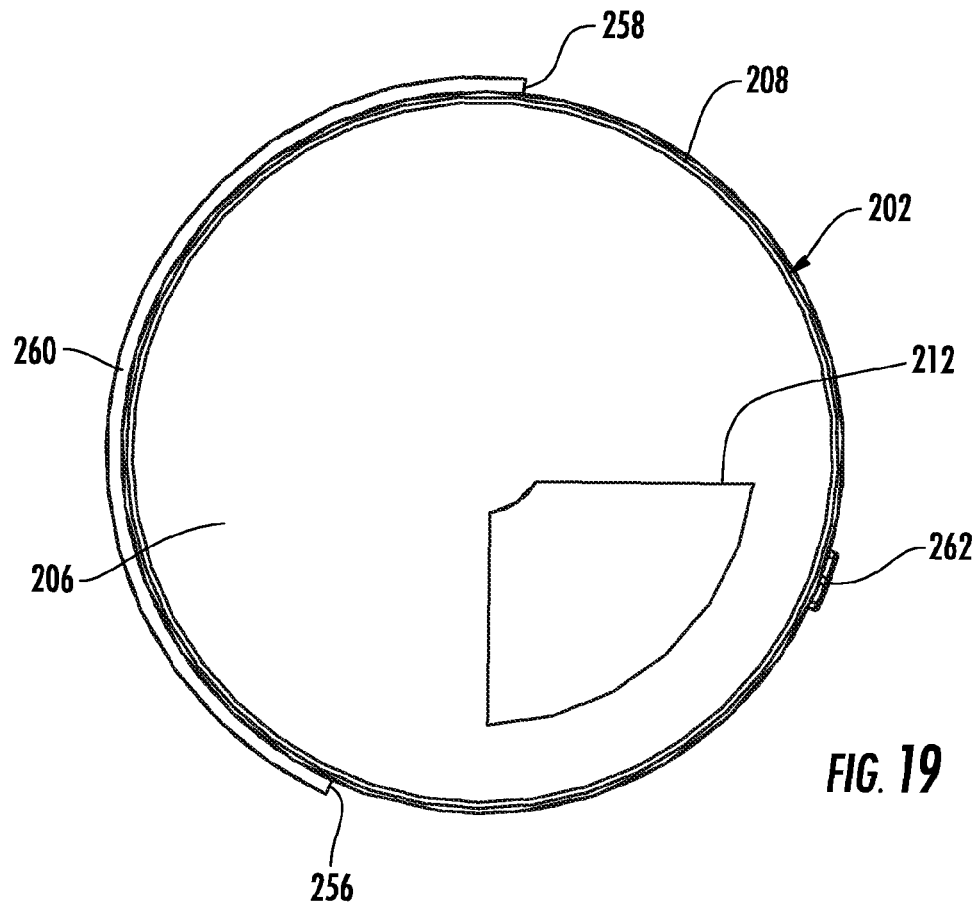
FIG. 19 is a top view of the dispensing cap thereof.
Figure 21:
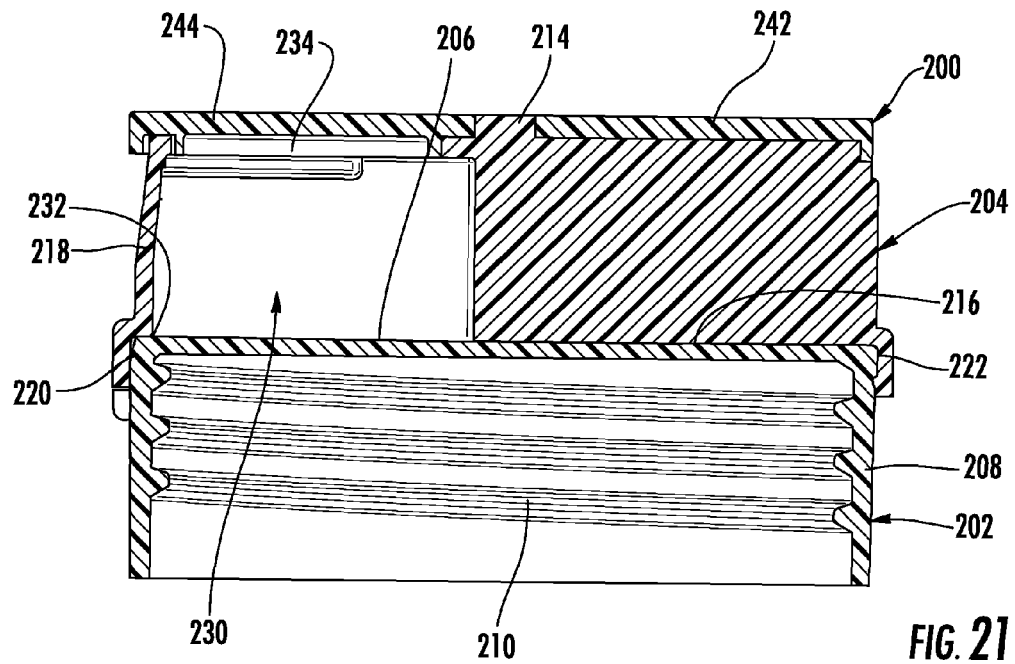
FIG. 21 is a cross-sectional view thereof taken along line 21-21 of FIG. 17.
Figure 23:
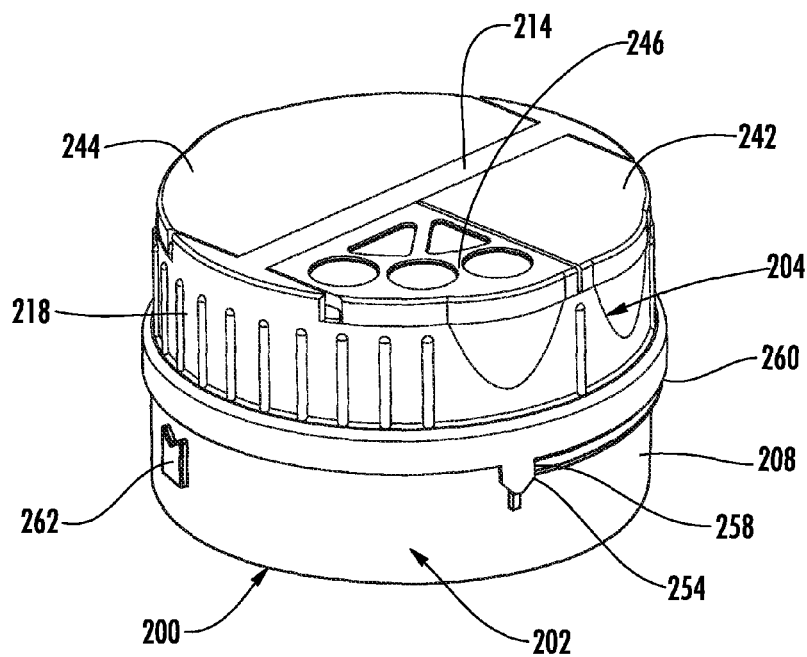
FIG. 23 is a perspective view thereof with the metering drum rotated to a second filling position.
Figure 22:
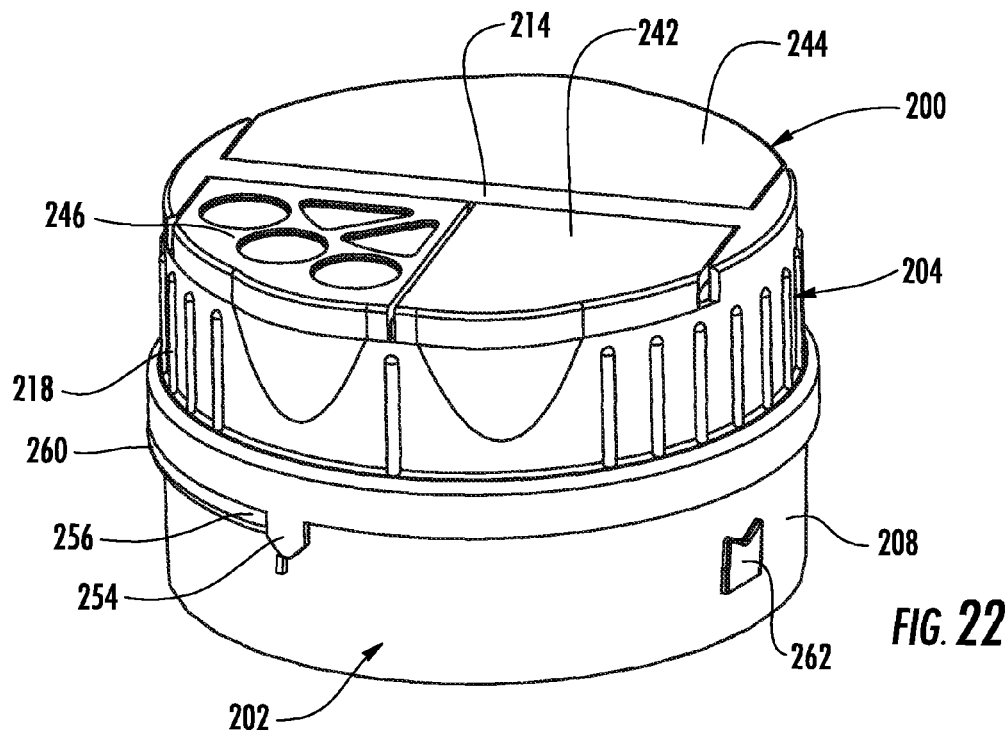
FIG. 22 is a perspective view thereof with the metering drum rotated to a first filling position.

Referring to FIGS. 18, 19 and 21, the dispensing cap 202 has a planar upper deck 206 and an outer skirt 208 depending downwardly from the upper deck 206. The outer skirt 208 has an inner surface with inwardly extending threads 210 configured and arranged to engage outwardly extending threads (not shown) on an outer surface of the neck 16 of the container 12. The upper deck 206 includes a shaped dispensing aperture 212 which allows a flow of the dry product from the container 12 into the metering drum 204.

Figure 20:
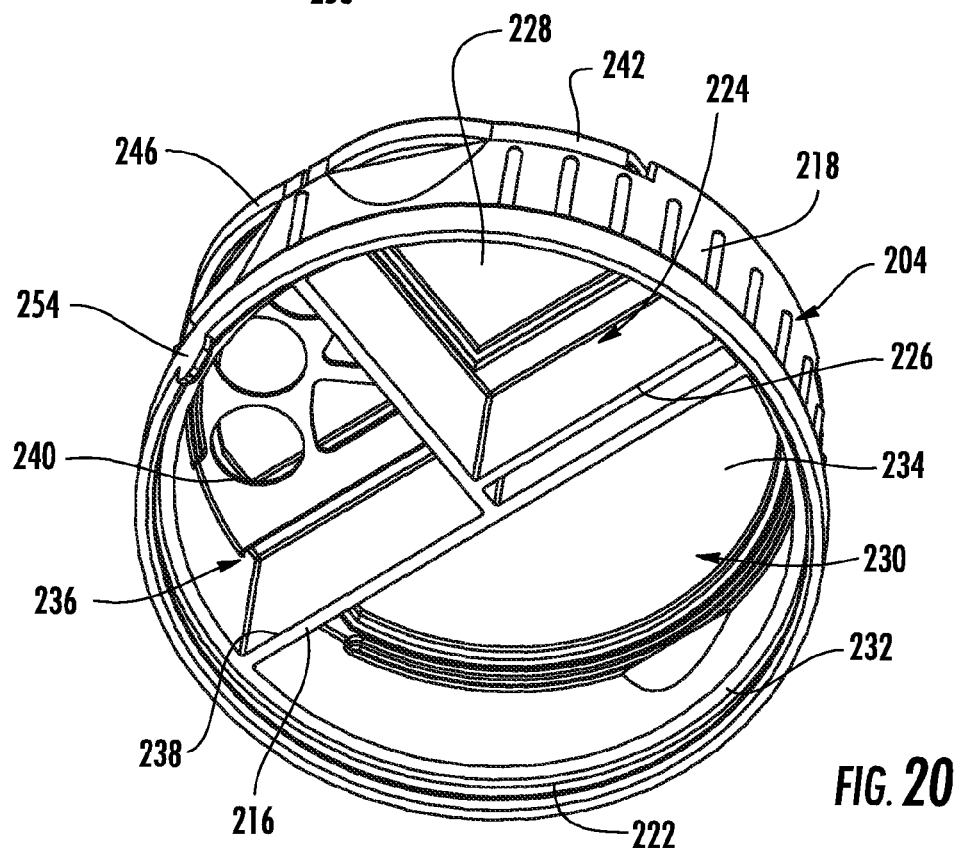
FIG. 20 is a bottom perspective view of the metering drum thereof.

Referring to FIGS. 18, 20 and 21, the metering drum 204 has an upper deck 214, a lower deck 216, and an outer skirt 218 extending between the upper and lower decks 214,216. The metering drum 204 is rotatably mounted on the dispensing cap 202 with the lower deck 216 of the metering drum 204 disposed in facing relation with the upper deck 206 of the dispensing cap 202 (See FIG. 21). As previously described hereinabove, the rotatable connection between the metering drum 204 and the dispensing cap 202 is provided by a continuous, outwardly extending snap bead 220 formed on the outer surface of the skirt 208 of the dispensing cap 202, and a complementary continuous, snap groove 222 formed on an inner surface of the outer skirt 218 of the metering drum 204. The snap groove 222 is snap received over the snap bead 220 to hold the dispensing cap 202 and metering drum 204 together in a friction fit, yet allows a relative sliding rotation of the parts.

Referring to FIG. 20, the metering drum 204 has a first metering chamber 224 extending between the upper and lower decks 214,216, the first metering chamber 224 having a first volume and further having an entrance aperture 226 in the lower deck 216 and an exit aperture 228 in the upper deck 214. The metering drum 204 also has a second metering chamber 230 extending between the upper and lower decks 214,216, the second metering chamber 230 having a second volume and further having an entrance aperture 232 in the lower deck 216 and an exit aperture 234 in the upper deck 214. Still further, the metering drum 204 has a third, direct dispense chamber 236 (a pass through chamber) extending between the upper and lower decks 214,216, the direct dispense chamber 236 having an entrance aperture 238 in the lower deck 216 and an exit aperture 240 in the upper deck 214.

Figure 17:
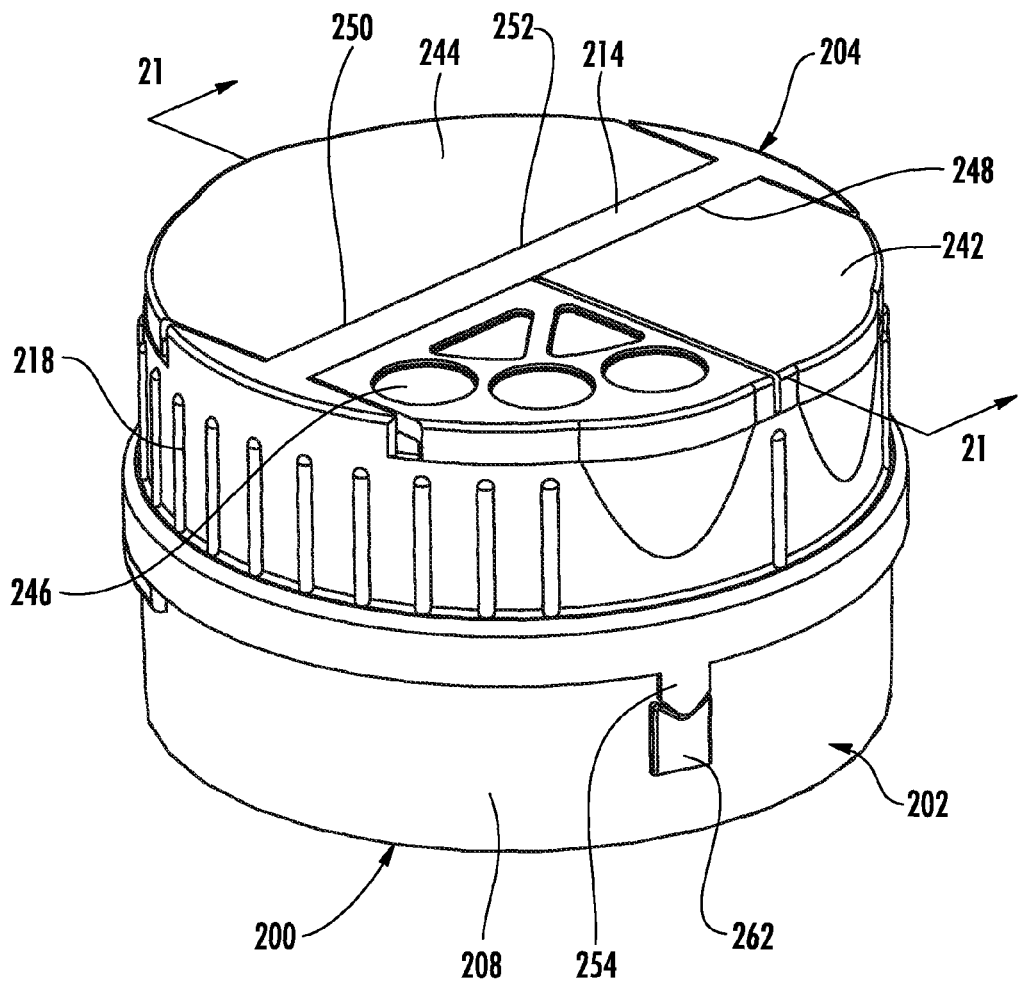
FIG. 17 is a perspective view of a third exemplary embodiment with the metering drum in the dispensing position.
Figure 24:
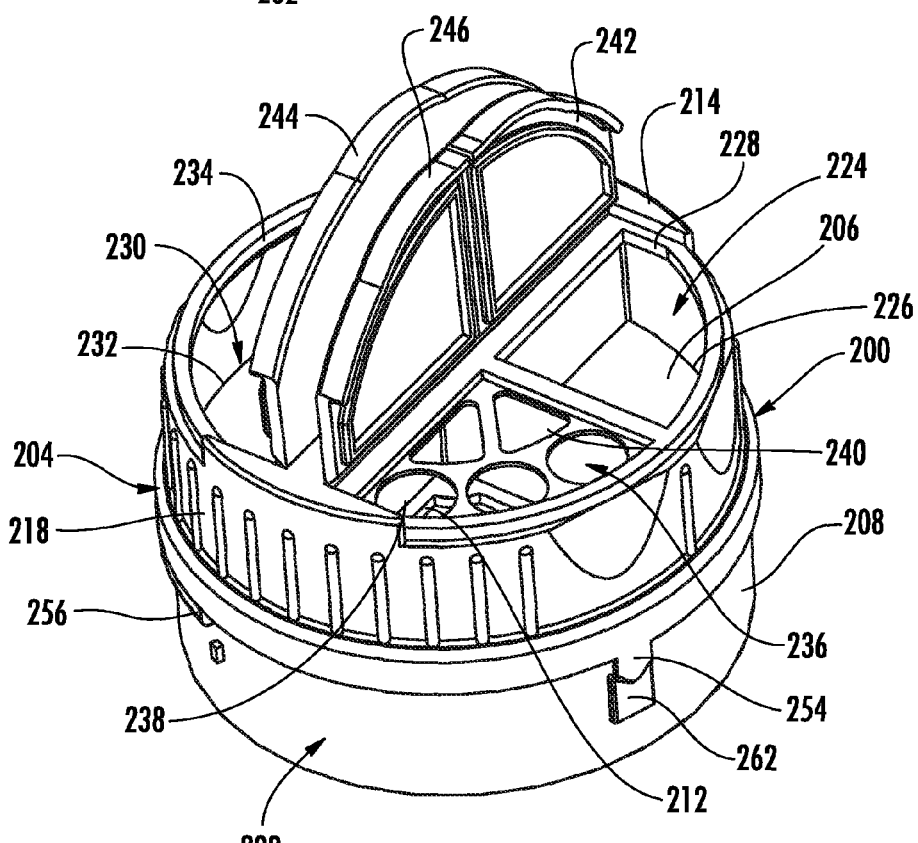
FIG. 24 is another perspective view thereof with the lids in the open position.

Referring to FIGS. 17 and 24, first, second and third lids 242, 244, 246 are hingeably secured to the metering drum 204 to selectively open and close the respective exit apertures 228,234,240 of the first metering chamber 224, the second metering chamber 230 and the third direct dispense chamber 236. In the exemplary embodiment, the first, second and third lids 242,244,246 are connected to the metering drum 204 by living hinges 248,250,252.

In operation, the metering drum 204 of the third embodiment is also selectively rotatable relative to the dispensing cap 202 from a normal dispensing position (FIGS. 17, 18 and 24) to a first filling position (FIG. 22), wherein the first metering chamber 224 becomes rotationally aligned with the dispensing aperture 212 and a first metered amount the dry product can flow from the container 12 into the first metering chamber 224. In use, the first lid 242 remains in the closed position and the container 12 is inverted to allow product to fill the first metering chamber 224.

The metering drum 204 is also rotatable to a second filling position (FIG. 23) wherein the second metering chamber 230 becomes rotationally aligned with the dispensing aperture 212 and a second metered amount the dry product can flow from the container 12 into the second metering chamber 230. As indicated above, the second lid 244 also remains in the closed position and the container 12 is inverted to allow product to fill the second metering chamber 230.

When either, or both, of the first or second metering chambers 224,230 is/are full, the metering drum 204 is rotatable back to the dispensing position (FIGS. 17 and 24) wherein the direct dispense (pass through) chamber 236 is rotationally aligned with the dispensing aperture 212. In the dispensing position, the upper deck 206 of the dispensing cap 202 forms a bottom wall to the first and second metering chambers 224,230. However, alignment of the direct dispense chamber 236 with the dispensing aperture 212 still permits dry product to freely flow into the direct dispense chamber 236 (See FIG. 24).

The metered amounts of the dry product can then be selectively dispensed from either the first or second metering chambers 224,230 when the first or second lid 242, 244 is opened. In addition, the dry product can also be selectively dispensed directly from the container 12 through the direct dispense chamber 236 when the metering drum 204 is located in the dispensing position and the third lid 246 is opened. This third embodiment 200 differs from the first and second embodiments 10, 100 in that direct dispensing of the product in the first and second embodiments 10,100 occurs when the metering drum is in the filling positions, rather than the dispensing position.

In order to accurately position the metering drum 204 in the filling and dispensing positions, the dispensing cap 202 and the metering drum 204 include complementary indexing formations which positively index the metering drum in the first and second filling positions (FIGS. 22 and 23) and the dispensing position (FIGS. 17 and 24). More specifically, the metering drum includes an indexing tab 254 extending downwardly from a peripheral lower edge of the skirt 218 which overlaps an outer surface of the skirt 208 of the dispensing cap 202. The dispensing cap 202 includes indexing ridges corresponding to the first and second filling positions and the dispensing position. In this third exemplary embodiment 200, the indexing ridges corresponding to the first and second filling positions comprise the opposing end walls 256,258 of a raised shoulder 260 extending outwardly from the outer surface of the skirt 208 of the dispensing cap 202. The indexing formation for the dispensing position comprises an independent raised detent 262 (FIGS. 17-18). When the metering drum 204 is rotated, the indexing tab 254 engages with the raised detent 262 and the end walls 256,258 to index the metering drum 204 in the respective position.

While there is shown and described herein certain specific structure of the exemplary embodiments, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing closure for dispensing a metered amount of a dry product from a container, said dispensing closure comprising:

a dispensing cap having an upper deck and a skirt depending downwardly from the upper deck, said skirt having an inner surface configured and arranged to engage an outer surface of a neck of said container, said upper deck including a dispensing aperture to allow a flow of said dry product from said container; and a metering drum having an upper deck, a lower deck, and an outer skirt extending between said upper and lower decks, said metering drum being rotatably mounted on said dispensing cap with said lower deck of said metering drum disposed in facing relation with said upper deck of said dispensing cap, said metering drum having a metering chamber extending between said upper and lower decks, said metering chamber having an entrance aperture in said lower deck and an exit aperture in said upper deck, a lid hingeably secured to said metering drum to selectively open and close said exit aperture of said metering chamber, said metering drum being selectively rotatable relative to said dispensing cap between a filling position wherein said metering chamber is rotationally aligned with said dispensing aperture and a metered amount said dry product flows from said container into said metering chamber when said lid is closed and said container is inverted and a dispensing position wherein said metering chamber is not rotationally aligned with said dispensing aperture, said upper deck of said dispensing cap forming a bottom wall to said metering chamber in said dispensing position, said dispensing cap and said metering drum include indexing formations to index said metering drum to said filling position and said dispensing position, wherein said metering drum includes an indexing tab extending downwardly from a peripheral lower edge of said outer skirt overlapping an outer surface of said skirt of said dispensing cap, and said dispensing cap includes indexing ridges on an outer surface of said skirt corresponding to said filling position and said dispensing position, said indexing tab engaging with said indexing ridges to index said metering drum in said respective position, said metered amount of said dry product being selectively dispensed from said metering chamber when said lid is opened.

2. The dispensing closure of claim 1 wherein said lid is joined to said metering drum with an integrally formed living hinge.

3. A dispensing closure for dispensing metered amounts of a dry product from a container, said dispensing closure comprising:
- a dispensing cap having an upper deck and a skirt depending downwardly from the upper deck, said skirt having an inner surface configured and arranged to engage an outer surface of a neck of said container, said upper deck including a dispensing aperture to allow a flow of said dry product from said container; and
- a metering drum having an upper deck, a lower deck, and an outer skirt extending between said upper and lower decks, said metering drum being rotatably mounted on said dispensing cap with said lower deck of said metering drum disposed in facing relation with said upper deck of said dispensing cap,
- said metering drum having a first metering chamber extending between said upper and lower decks, said first metering chamber having a first volume and further having an entrance aperture in said lower deck and an exit aperture in said upper deck,
- said metering drum having second metering chamber extending between said upper and lower decks, said second metering chamber having a second volume and further having an entrance aperture in said lower deck and an exit aperture in said upper deck,
- a first lid hingeably secured to said metering drum to selectively open and close said exit aperture of said first metering chamber,
- a second lid hingeably secured to said metering drum to selectively open and close said exit aperture of said second metering chamber,
- said metering drum being selectively rotatable relative to said dispensing cap between a first filling position wherein said first metering chamber is rotationally aligned with said dispensing aperture and a first metered amount said dry product flows from said container into said first metering chamber when said first lid is closed and said container is inverted, a second filling position wherein said second metering chamber is rotationally aligned with said dispensing aperture and a second metered amount said dry product flows from said container into said second metering chamber when said second lid is closed and said container is inverted, and a third dispensing position wherein neither said first metering chamber nor said second metering chamber is rotationally aligned with said dispensing aperture, said upper deck of said dispensing cap forming a bottom wall to said first and second metering chambers in said third dispensing position,
- wherein said dispensing cap and said metering drum include indexing formations to index said metering drum to said first and second filling positions and said dispensing position,
- wherein said metering drum includes an indexing tab extending downwardly from a peripheral lower edge of said outer skirt overlapping an outer surface of said skirt of said dispensing cap, and said dispensing cap includes indexing ridges on an outer surface of said skirt corresponding to said first and second filling positions and said dispensing position, said indexing tab engaging with said indexing ridges to index said metering drum in said respective position,
- said first or second metered amount of said dry product being selectively dispensed from said first or second metering chamber when said first or second lid is opened.

4. The dispensing closure of claim 3 wherein said first and second lids are joined to said metering drum with integrally formed living hinges.

5. A dispensing closure for dispensing metered amounts of a dry product from a container, said dispensing closure comprising:
- a dispensing cap having an upper deck and a skirt depending downwardly from the upper deck, said skirt having an inner surface configured and arranged to engage an outer surface of a neck of said container, said upper deck including a dispensing aperture to allow a flow of said dry product from said container; and
- a metering drum having an upper deck, a lower deck, and an outer skirt extending between said upper and lower decks, said metering drum being rotatably mounted on said dispensing cap with said lower deck of said metering drum disposed in facing relation with said upper deck of said dispensing cap,
- said metering drum having a first metering chamber extending between said upper and lower decks, said first metering chamber having a first volume and further having an entrance aperture in said lower deck and an exit aperture in said upper deck,
- said metering drum having second metering chamber extending between said upper and lower decks, said second metering chamber having a second volume and further having an entrance aperture in said lower deck and an exit aperture in said upper deck,
- said metering drum having a direct dispense chamber extending between said upper and lower deck, said direct dispense chamber having an entrance aperture and an exit aperture,
- a first lid hingeably secured to said metering drum to selectively open and close said exit aperture of said first metering chamber,
- a second lid hingeably secured to said metering drum to selectively open and close said exit aperture of said second metering chamber,
- a third lid hingeably secured to said metering drum to selectively open and close said exit aperture of said direct dispense chamber,
- said metering drum being selectively rotatable relative to said dispensing cap between a first filling position wherein said first metering chamber is rotationally aligned with said dispensing aperture and a first metered amount said dry product flows from said container into said first metering chamber when said first lid is closed and said container is inverted, a second filling position wherein said second metering chamber is rotationally aligned with said dispensing aperture and a second metered amount said dry product flows from said container into said second metering chamber when said second lid is closed and said container is inverted, and a third dispensing position wherein said direct dispense chamber is rotationally aligned with said dispensing aperture and said upper deck of said dispensing cap form a bottom wall to said first and second metering chambers, wherein said dispensing cap and said metering drum include indexing formations to index said metering drum to said first and second filling positions and said dispensing position, wherein said metering drum includes an indexing tab extending downwardly from a peripheral lower edge of said outer skirt overlapping an outer surface of said skirt of said dispensing cap, and said dispensing cap includes indexing ridges on an outer surface of said skirt corresponding to said first and second filling positions and said dispensing position, said indexing tab engaging with said indexing ridges to index said metering drum in said respective position, said first or second metered amount of said dry product being selectively dispensed from said first or second metering chamber when said first or second lid is opened, said dry product being selectively dispensed directly from said container through said direct dispense chamber when said third lid is opened.

6. The dispensing closure of claim 5 wherein said first, second and third lids are joined to said metering drum with integrally formed living hinges.

\* \* \* \* \*